(12) United States Patent
Eckhardt et al.

(10) Patent No.: US 7,190,709 B2
(45) Date of Patent: Mar. 13, 2007

(54) EARLY-LATE CORRELATION FOR TIMING ERROR CORRECTION IN DATA COMMUNICATION RECEIVERS

(75) Inventors: Uwe Eckhardt, Dresden (DE); Jörg Borowski, Dresden (DE); Tilo Ferchland, Dresden (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 714 days.

(21) Appl. No.: 10/464,960

(22) Filed: Jun. 19, 2003

(65) Prior Publication Data

US 2004/0088609 A1  May 6, 2004

(30) Foreign Application Priority Data

Nov. 4, 2002  (DE) .............. 102 51 322

(51) Int. Cl.
*H04L 27/00* (2006.01)
(52) U.S. Cl. .............. 375/145; 375/150; 375/359; 375/362; 375/375; 370/509; 370/518
(58) Field of Classification Search ......... 375/142, 375/145, 149, 150, 326, 327, 359, 362, 371, 375/373, 375, 376; 370/503, 509, 516, 517, 370/518
See application file for complete search history.

(56) References Cited

U.S. PATENT DOCUMENTS 6,456,648 B1  9/2002  Bultan et al.
6,473,449 B1  10/2002  Cafarella et al.
6,549,559 B2 *  4/2003  Kamgar et al. ............. 375/134
6,658,242 B1 *  12/2003  Knutson et al. ......... 455/232.1
2002/0037028 A1 *  3/2002  Baltersee et al.

FOREIGN PATENT DOCUMENTS

| DE | 198 60 720 A1 | 12/1998 |
|---|---|---|
| GB | 2 298 110 A | 8/1996 |
| GB | 2 371 725 A | 7/2002 |

* cited by examiner

*Primary Examiner*—Dac V. Ha
(74) *Attorney, Agent, or Firm*—Meyertons Hood Kivlin Kowert & Goetzel, P.C.; B. Noël Kivlin

(57) ABSTRACT

A timing error correction technique for use in data communications receivers such as WLAN (Wireless Local Area Network) receivers is provided where an input signal is received that has a timing error, the timing error is corrected, and a signal having a corrected timing error is output. The timing error correction comprises performing an early-late correlation on the signal that has the corrected timing error. The early-late correlation comprises the generation of at least one early and late sample pair, the generation of an error signal that is indicative of the difference between the early and late samples, and the generation of at least one control signal based on the error signal. A time offset correction algorithm is performed dependent on the control signal.

52 Claims, 5 Drawing Sheets

EARLY-LATE CORRELATION FOR TIMING ERROR CORRECTION IN DATA COMMUNICATION RECEIVERS

BACKGROUND OF THE INVENTION

1. Field of the Invention

The invention generally relates to WLAN (Wireless Local Area Network) receivers and receivers in other data communications systems, and in particular to the timing error correction in such receivers.

2. Description of the Related Art

A wireless local area network is a flexible data communications system implemented as an extension to or as an alternative for, a wired LAN. Using radio frequency or infrared technology, WLAN systems transmit and receive data over the air, minimizing the need for wired connections. Thus, WLAN systems combine data connectivity with user mobility.

Today, most WLAN systems use spread spectrum technology, a wide-band radio frequency technique developed for use in reliable and secure communication systems. The spread spectrum technology is designed to tradeoff bandwidth efficiency for reliability, integrity and security. Two types of spread spectrum radio systems are frequently used: frequency hopping and direct sequence systems.

The standard defining and governing wireless local area networks that operate in the 2.4 GHz spectrum, is the IEEE 802.11 standard. To allow higher data rate transmissions, the standard was extended to 802.11b that allows data rates of 5.5 and 11 Mbps in the 2.4 GHz spectrum. This extension is backwards compatible.

When operating a WLAN receiver, code synchronization is necessary because the code is the key to despreading the desired information. A good synchronization is achieved when the coded signal arriving at the receiver is accurately timed in both its code pattern position and its rate of chip generation.

Referring now to FIG. 1, the synchronization process performed in the WLAN receiver can be divided into two phases. First, a synchronization acquisition is performed in step 100 to initially synchronize the receiver with a received signal. The second part of the synchronization follows the initial acquisition since the receiver must continue to operate in such a way that it remains locked with its code reference. That is, the receiver exactly tracks in step 110 the coded incoming signal to cause its own code chip rate to match the incoming code chip rate as precisely as possible.

With respect to the synchronization algorithms used, receivers may be classified into data-aided and non data-aided receivers. The data-aided approach does not require a prior knowledge of the interference parameters but requires a training data sequence. Non data-aided (or blind) algorithms require no training data sequence but only knowledge of the desired user signal sequence and its timing.

Generally, synchronization in data communications receivers may include a frequency error correction for correcting a frequency error in the received signal, and a phase error correction for correcting the phase error that may still exist after correcting the frequency error. Moreover, data communication receivers usually apply some timing error correction to compensate for timing errors.

Timing errors can be understood as deviations in a clock's output transitions from its ideal positions. Timing errors may be induced and coupled onto a clock signal from several different sources and are usually uniform over all frequencies. Common sources for timing errors are random noise which may be electronic, thermal and mechanical noise. A well known example of such timing errors is the so called jitter. Timing errors need to be compensated since they increase the bit and packet error rates in data communications and violate the timing margins.

Most conventional timing error correction schemes in data communications receivers such as WLAN receivers make use of synchronization patterns such as synchronization preambles. A preamble is a well-chosen code sequence that is sent at the beginning of each transmission, for use at least in the synchronization acquisition process. Timing error correction schemes based on such synchronization preambles usually involve the computation of cross-correlations and therefore require involved arithmetics to be performed. Such operations can usually not be realized by simple circuit implementations.

In addition, timing error correction circuits in existing data communications receivers still have a number of problems. One problem is that conventional circuits may be unstable in operation and sometimes work unreliably. Further, the circuits often are highly involved and therefore lead to high circuit development and manufacturing costs. Moreover, instability situations may occur when performing the synchronization acquisition.

SUMMARY OF THE INVENTION

An improved timing error correction technique is provided that may provide for simple and stable timing error compensation.

In one embodiment, a WLAN receiver is provided that has a timing error correction unit. The timing error correction unit comprises a time offset correction unit that is connected to receive an input signal having a timing error and output a signal having a corrected timing error. The time offset correction unit is adapted to perform a time offset correction algorithm to correct the timing error. The timing error correction unit further comprises a sample pair generation unit that is connected to receive the output signal of the time offset correction unit and that is adapted to generate at least one sample pair therefrom. The at least one sample pair comprises an early sample and a late sample. The timing error correction unit further comprises a difference computation unit that is connected to receive the at least one sample pair and that is adapted to generate an error signal that is indicative of the difference between the value of the early sample and the value of the late sample of the received sample pair. Further, the timing error correction unit comprises a control unit that is connected to receive the error signal and that is adapted to generate at least one control signal therefrom. The control unit is connected to the time offset correction unit to provide the at least one control signal to the time offset correction unit to control the time offset correction algorithm.

In another embodiment, there may be provided a receiver synchronizer for performing time synchronization in a data communications receiver. The receiver synchronizer has a timing error correction unit that comprises a time offset correction unit that is connected to receive an input signal having a timing error and output a signal having a corrected timing error. The time offset correction unit is adapted to perform a time offset correction algorithm to correct the timing error. The timing error correction unit further comprises a sample pair generation unit that is connected to receive the output signal of the time of said correction unit and that is adapted to generate at least one sample pair therefrom. The at least one sample pair comprises an early sample and a late sample. The timing error correction unit further comprises a difference computation unit that is connected to receive the at least one sample pair and that is adapted to generate an error signal indicative of the difference between the value of the early sample and the value of the late sample of the received sample pair. Further, the timing error correction unit comprises a control unit that is connected to receive the error signal and that is adapted to generate at least one control signal therefrom. The control unit is connected to the time of said correction unit to provide the at least one control signal to the time of said correction unit to control the time of said correction algorithm.

In a further embodiment, an integrated circuit chip is provided that has timing error correction circuitry. The timing error correction circuitry comprises a time offset correction circuit that is connected to receive an input signal having a timing error and output a signal having a corrected timing error. The time of said correction unit is adapted to perform a time offset correction algorithm to correct the timing error. The timing error correction circuitry further comprises a sample pair generation circuit that is connected to receive the output signal of the time offset correction circuit and that is adapted to generate at least one sample pair therefrom. The at least one sample pair comprises an early sample and a late sample. The timing error correction circuitry further comprises a difference computation circuit that is connected to receive the at least one sample pair and that is adapted to generate an error signal indicative of the difference between the value of the early sample and the value of the late sample of the received sample pair. Further, the timing error correction circuitry comprises a control circuit that is connected to receive the error signal and that is adapted to generate at least one control signal therefrom. The control circuit is connected to the time offset correction circuit to provide the at least one control signal to the time offset correction circuit to control the time offset correction algorithm.

In still a further embodiment, a method of correcting a timing error in a data communications receiver comprises receiving an input signal having a timing error, correcting the timing error, and outputting a signal having a corrected timing error. Correcting the timing error comprises performing an early-late correlation on the signal having a corrected timing error.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings.

Figure 1:
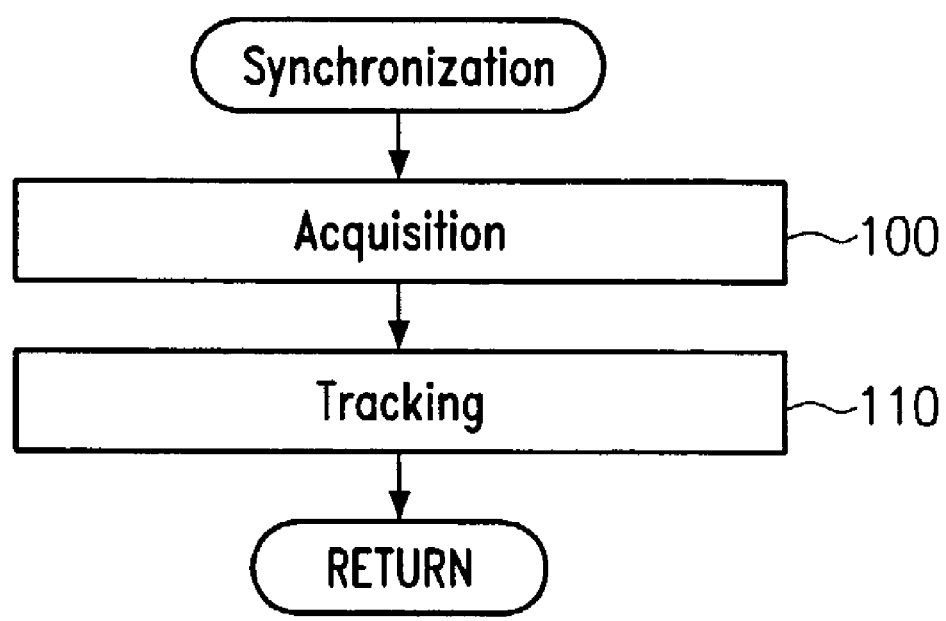
FIG. 1 is a flowchart illustrating the phases which can be distinguished in a synchronization process of a data communications receiver.
Figure 2:
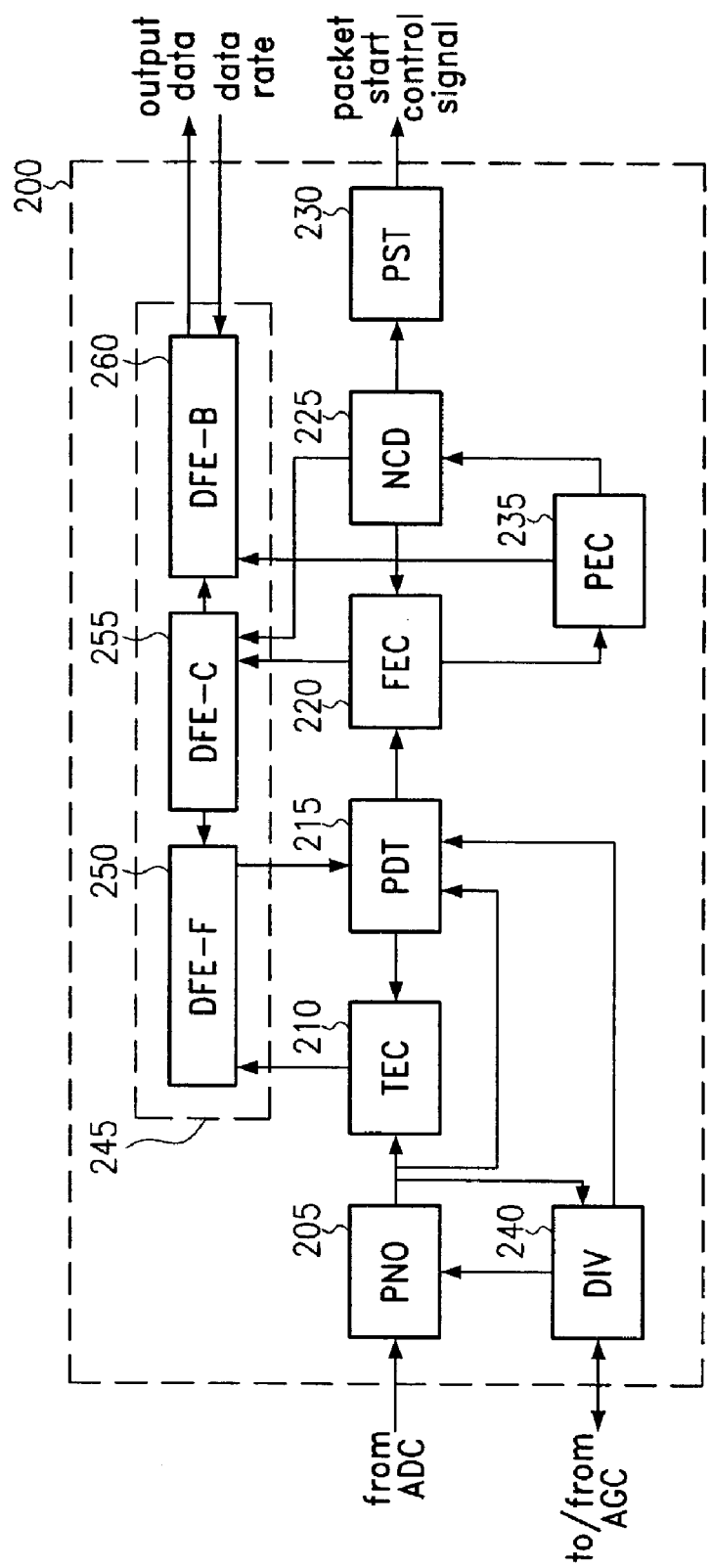
FIG. 2 is a block diagram illustrating the components of a WLAN receiver according to an embodiment.

Referring now to the drawings and particular to FIG. 2 which illustrates the components of a WLAN receiver according to an embodiment, the receiver has a radio-frequency part and a baseband part 200 that is connected to the radio-frequency part. The radio-frequency part is an analog circuit that receives an analog signal and provides a digitized representation thereof to the baseband part 200. For this purpose, the radio-frequency part comprises an analog-to-digital converter (ADC).

Moreover, the radio-frequency part performs an automatic gain control (AGC) to control the amplification gain dependent on the received signal power or strength. The AGC unit is located in the analog radio-frequency part and interchanges control signals with the digital circuitry of the baseband part 200.

The baseband part 200 of the WLAN receiver of the present embodiment shown in FIG. 2 has a number of units that are interconnected to form a data path. That is, the baseband part 200 receives the digitized input signal from the radio-frequency part and generates output data that is to be filtered, demodulated, decoded and descrambled for further processing.

When receiving the digitized input signal in the baseband part 200, a power normalization (PNO) is performed in unit 205 to normalize the power of the input signal. The power normalization may be performed under control of a diversity selection (DIV) unit 240 that controls antenna diversity and which is connected to the automatic gain controller of the radio-frequency part. For performing the diversity selection, unit 240 receives the normalized signal from unit 205.

The diversity selection unit 240 may further provide a control signal to preamble detection (PDT) unit 215. The preamble detection unit 215 receives the normalized signal from unit 205 and detects a preamble in this signal. A preamble is a special signal pattern used for synchronization acquisition.

As may be seen from FIG. 2, the preamble detection unit 215 provides output signals to a timing error correction (TEC) unit 210 and a frequency error correction (FEC) unit 220. These units are used to detect and correct timing errors and frequency errors, respectively.

As mentioned above, the preamble detection unit 215 receives the normalized input signal from power normalization unit 205. In addition, it receives input from the feedforward filter (DFE-F) 250 of a decision feedback equalizer 245. The feedforward filter 250 receives the output signal of the timing error correction unit 210 and filters this signal under control of decision feedback equalization controller (DFE-C) 255. The filtered signal is fed to the preamble detection unit 215.

As can further be seen from FIG. 2, the decision feedback equalization controller 255 may operate dependent on certain input signals that are received from the frequency error correction unit 220 and/or the non-coherent detection (NCD) unit 225. The non-coherent detection unit 225 filters and demodulates a signal that is received from the phase error correction (PEC) unit 235 to obtain a demodulated binary reference sequence. This binary reference sequence is fed into the decision feedback equalization controller 255 for joint processing with the data signal coming from frequency error correction unit 220.

The phase error correction unit 235 that provides a signal to the non-coherent detection unit 225 receives an output signal from the frequency error correction unit 220. That is, the frequency control and the phase control may be done in two separate stages, and the phase error correction may be performed based on a signal that has previously been corrected with respect to a frequency error.

As apparent from the figure, the phase error correction unit 235 further provides an input signal to the feedback filter 260 of the decision feedback equalizer 245. The feedback filter 260 filters this data to provide output data, and it is controlled by the decision feedback equalization controller 255. Further, the feedback filter 260 may receive a signal which is indicative of the data rate.

Moreover, there is provided a packet start detection (PST) unit 230 that detects the start of frame delimiter (SFD) portion in the received data signal to generate a packet start control signal. For this purpose, the packet start detection unit 230 receives input from the non-coherent detection unit 225.

Discussing now in more detail the timing error correction process according to the embodiments, the timing error correction unit 210 of the WLAN receiver shown in FIG. 2 will now be explained in more detail with reference to FIG. 3. It is to be noted that the timing error correction unit shown in FIG. 3 may be used in the arrangement of FIG. 2, but it may also be used in any other receiver structure where a timing error needs to be corrected.

As can be seen from FIG. 3 and will be discussed in more detail below, the timing error correction according to the embodiments perform an early-late correlation on the signal that has a corrected timing error. That is, the timing error correction unit of FIG. 3 comprises an interpolation filter 300 that receives the input signal that has the timing error, and that outputs a signal having a corrected timing error. Thus, the interpolation filter 300 performs the actual time offset correction. The output signal which is the signal having a corrected timing error, is provided to the correlator 310 that operates together with the early-late computation unit 320. Further, there is provided a loop filter 330 that receives the output of the early-late computation unit 320. Thus, the correlator 310, the early-late computation unit 320, and the loop filter 330 may be understood as performing an early-late correlation on the signal that has a corrected timing error.

Before going into the details of how the individual units of the timing error correction unit shown in FIG. 3 may be realized, the general concept will now be described. The interpolation filter 300 that performs the actual time offset correction, is controlled by the loop filter 330. In more detail, the loop filter 330 provides control signals to the interpolation filter 300 for controlling the time offset algorithm performed by the interpolation filter 300. The control signals of the present embodiment comprise filter coefficients as well as a signal that indicates an integer time shift. As will be apparent from the description below, the interpolation filter may use the integer shift signal to realize integer time offsets by properly selecting tap windows, and modify its filter characteristics according to the filter coefficients received from the loop filter 330.

Based on the real and imaginary output signals of the interpolation filter 300, the correlator 310 performs some signal correlation to generate early and late sample pairs. The sample pairs are passed to the early-late computation unit 320 where a signal is generated that is indicative of the difference between the value of the early sample and the value of the late sample. This error signal is then used by the loop filter 330 to generate the control signals.

Figure 3:
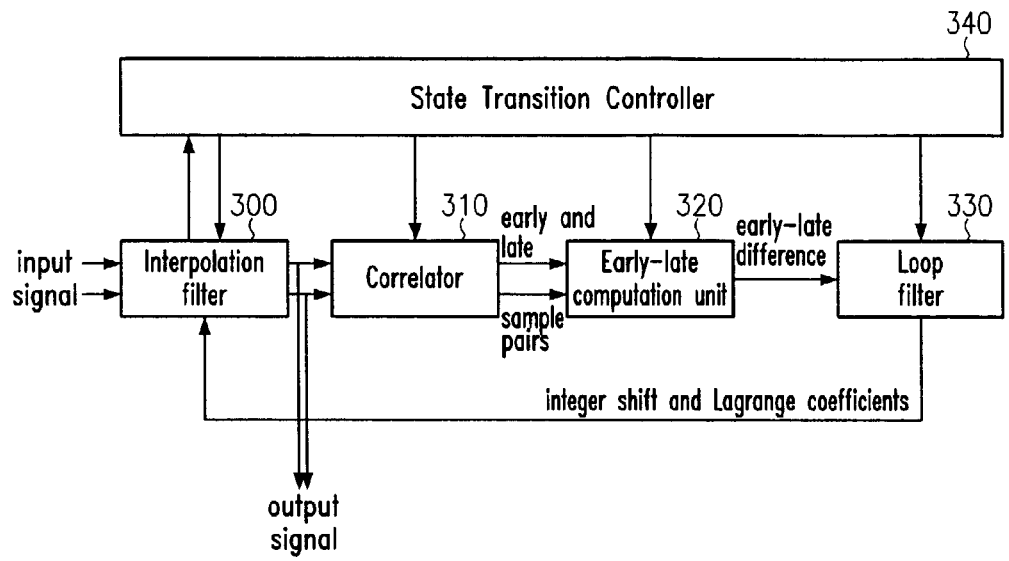
FIG. 3 illustrates a timing error correction unit according to an embodiment that may be used in the arrangement of FIG. 2.

As may further be seen from FIG. 3, the timing error correction unit comprises a state transition controller 340 that may be a finite state machine. The state transition controller 340 is connected to the interpolation filter 300, the correlator 310, the early-late computation unit 320, and the loop-filter 330 for controlling the units by stepping through a plurality of predefined control states.

Figure 7:
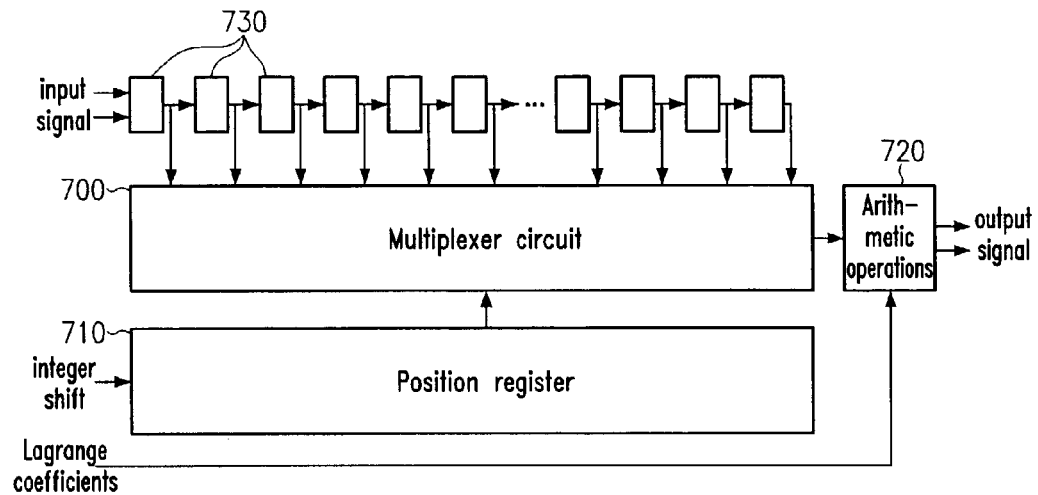
FIG. 7 illustrates the interpolation filter in more detail that is a component of the timing error correction unit of FIG. 3, according to an embodiment.

The interpolation filter 300 of the present embodiment which will be discussed in more detail below with reference to FIG. 7, is a Lagrange filter. It is to be noted that other interpolation techniques may be used in other embodiments, including other polynomial interpolation techniques.

Figure 4:
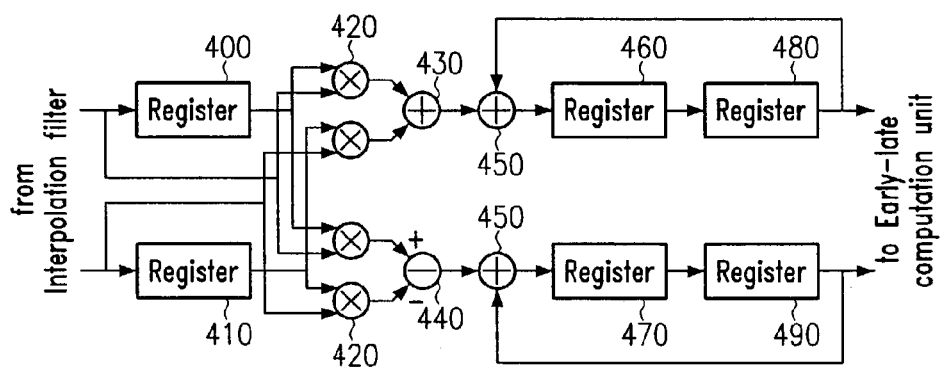
FIG. 4 illustrates the correlator in more detail that is a component of the timing error correction unit of FIG. 3, according to an embodiment.

Turning now to FIG. 4 which illustrates the components of the correlator 310, the signals that are received from the interpolation filter 300 are first registered in registers 400, 410. Further, multipliers 420 are provided, each for multiplying one of the registered values with one of the currently received values. The multiplication results are then supplied to an adder 430 or a subtractor 440, respectively. These arithmetics form the main parts of the signal correlation performed by correlator 310.

As can further be seen from FIG. 4, there are registers 460–490 provided for each of the resulting (real and imaginary) signals. In both paths, two registers are provided in series and arranged in a feedback loop. That is, the outputs of respective ones of the registers 480, 490 are fed back to a respective adder 450 that writes its addition result to the respective other registers 460, 470.

That is, one of the registers in each pass stores the early sample while the other stores the late sample. Thus, the correlator 310 generates two sample pairs each comprising an early and a late sample.

In the present embodiment, the correlator 310 is twice oversampled to compute the correlation function on the data of the output signals of the interpolation filter 300. In more detail, the correlator 310 of the present embodiment calculates the correlation function over sixteen samples.

Figure 5:
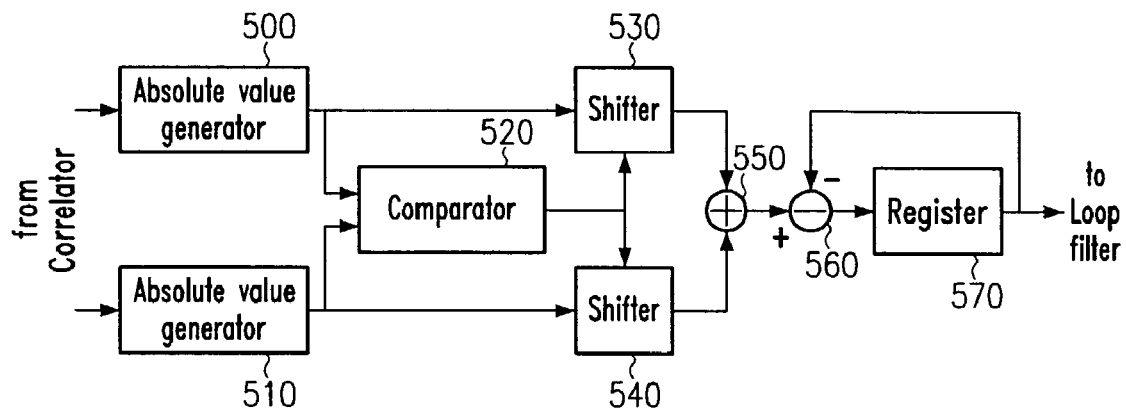
FIG. 5 illustrates the early-late computation unit in more detail that is a component of the timing error correction unit of FIG. 3, according to an embodiment.

The early and late sample pairs are then passed to the early-late computation unit 320 which is illustrated in more detail in FIG. 5. As can be seen from this figure, the early-late computation unit 320 comprises in each (real and imaginary) data path an absolute value generate 500, 510 for generating absolute values of the received samples. In more detail, when assuming the variable a to be the input real data and b to be the input imaginary data and further assuming x and y to be the respective absolute values that are output, the operation of the absolute value generator 500 may be written as:

$$x = a[6] + \{7\{a[6]\}\}\wedge a$$
$$= \text{abs}(a)$$

while the output of the absolute value generator 510 is given by:

$$y = b[6] + \{7\{b[6]\}\}\wedge b$$
$$= \text{abs}(b)$$

Based on the absolute values x and y of the real and imaginary input data, the absolute value of the respective complex sample will now be calculated using an approximation unit that comprises a comparator 520, two shifters 530, 540 and an adder 550. In more detail, the comparator 520 receives the absolute values x, y of the real and imaginary parts and generates a shift control signal s dependent on the comparison result:

$$x>y?s=0:s=1$$

Based on this shift control signal, the shifter 530 will now perform one shift operation:

$$>>s$$

while the shifter 540 performs the following operation:

$$>>\sim s$$

The outputs of the shifters 530 and 540 are then summed up by adder 550 to provide the approximated absolute value of the complex data.

It is to be noted that the absolute value approximation unit 520–550 provides an approximation of the square route of the sum of the squared absolute values of the real and imaginary samples, but avoids to really calculate the square root. Thus, the approximation unit advantageously avoids highly involved arithmetic operations.

The thus generated absolute value of the complex sample is now input to a sub-unit that comprises a register 570 and a subtractor 560. This sub-unit computes the early-late difference between the value of the early sample and the value of the late sample, and outputs this difference to the loop filter 330. It is to be noted that in another embodiment, the output data indicates the difference between the value of the late sample and the value of the early sample so that the output difference needs to be inverted before undergoing further processing.

As can further be seen from FIG. 5, the sub-unit that actually computes the early-late difference comprises a register 570 and a subtraction unit 560 where the register 570 is connected to an input port of the subtraction unit 560 to provide the registered data to the subtraction unit 560 and is further connected to an output port of the subtraction unit 560 to receive the subtraction result to be written into the register 570. Thus, this unit operates in two cycles where in the first cycle, the absolute value of the early (or late) sample is written into the register 570 and in the second cycle, the registered value is subtracted from the absolute value of the late (or early) sample. Thus, at the end of the second cycle, the register 570 stores the difference between the absolute sample values.

Figure 6:
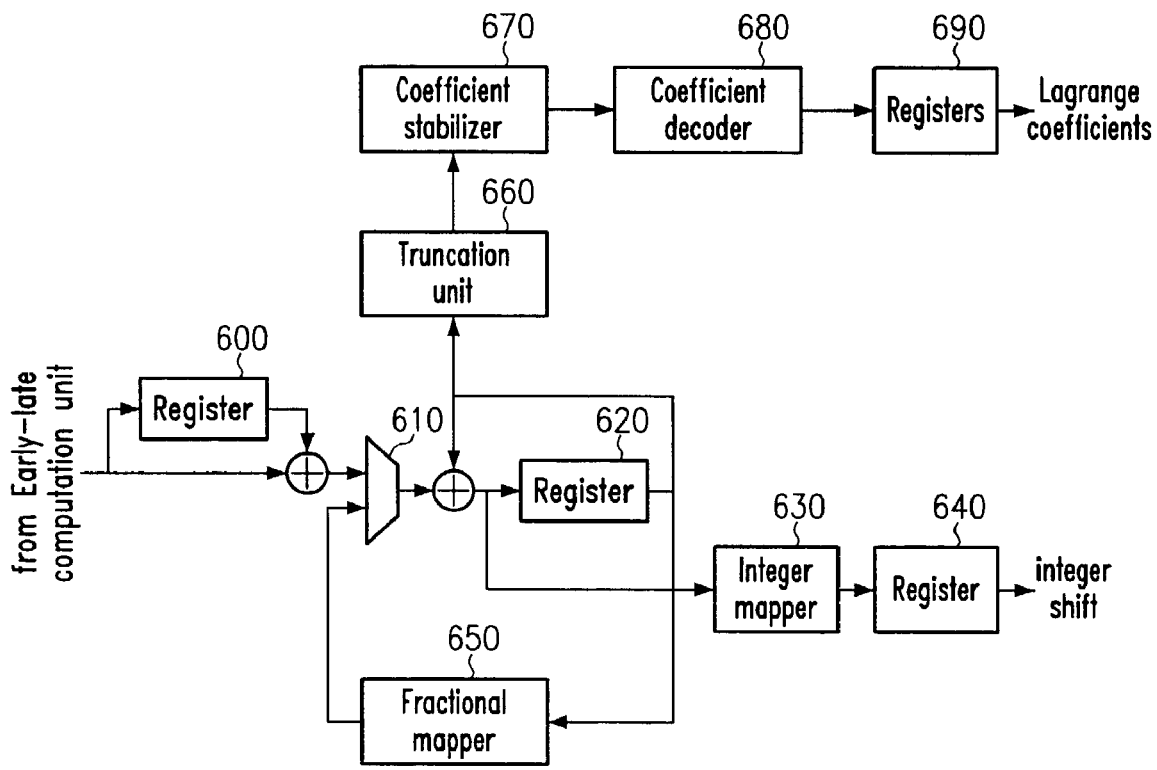
FIG. 6 illustrates the loop filter in more detail that is a component of the timing error correction unit of FIG. 3, according to an embodiment.

Turning now to FIG. 6 which illustrates in more detail the components of the loop filter 330 that operates as control unit in the timing error correction unit of FIG. 3, it can be seen that the loop filter 330 comprises an integration circuit 600, 610, 620 that performs an integration on a signal that is derived from the error signal provided by the early-late computation unit 320. Further, a control signal update circuit 620–690 is provided to generate and update the control signals that are sent to the interpolation filter 300, i.e., the integer shift signal and the Lagrange coefficients. The integration circuit and the control signal update circuit operate sequentially and share modules, in particular the register 620 and its preceding adder. It is to be noted that further registers or other modules may be shared in other embodiments.

Turning first to the integration circuit, the error signal coming from the early-late computation unit 320, i.e. the early-late difference, is stored in the register 600, and the registered value is added to the current value by means of an adder. The sum is then written to register 620 which is located in a feedback loop.

The control signal update circuit makes use of the registered value in a two cycle process. In a first cycle, an integer time shift $\Delta_{int}$ is detected and calculated by means of integer mapper 630, and output to the interpolation filter 300 via register 640. In the second cycle, where the integer time shift is already compensated, the control signal update circuit detects the remaining fractional time shift $\Delta-\Delta_{int}$ by fractional mapper 650, and feeds the fractional time shift back to the multiplexer 610 so that the fractional time shift can be used in the subsequent processing to determine updated Lagrange coefficients.

Thus, the integer time shift and the fractional time shift are signalized in different cycles, and this time difference corresponds in the present embodiment to one clock.

Once the integer time shift is compensated and the fractional time shift is determined, the value of the register 620 is provided to the truncation unit 660 for performing a symbol truncation in the second cycle. The operation of the truncation unit 660 may be written as follows, assuming that x is the input to the truncation unit 660 and z is its output:

$$z=x[8:3]+(x[8]\&(|x[2:0]))$$

Further, a stabilization unit 670 is provided for stabilizing the fractional time shift signal output by the truncation unit 660. The operation of the coefficient stabilizer 670 may be the following, assuming z to be the stabilizer input and y to be its output:

if $(z[5]\&\&\sim(|z[3:0]))y=0$;

else $y=\{z[5],z[3:0]\}$

The output of the coefficient stabilizer 670 is then forwarded to the Lagrange polynomial coefficient decoder 680 that generates updated Lagrange filter coefficients that are now registered in registers 690 before being provided to the interpolation filter 300 as control signals.

In the embodiment of FIG. 6, the operation of the integer mapper 630 may be written as follows, assuming x to be the integer mapper input and z to be its output:

if $(x<=-1)z=2'b10$;

else if $(x>=1)z=2'b01$;

else $z=2'b0$

Similarly, the operation of the fractional mapper 650 may be the following, assuming that a is the mapper input and b its output:

if ($a<=-1$) $b=1$;

else if ($a>=1$) $b=-1$;

else $b=0$

Turning now to the interpolation filter 300 which is illustrated in more detail in FIG. 7, the filter primarily comprises a tap line 730, a multiplexer circuit 700, a position register 710, and a circuit 720 for performing arithmetic operations. The tap line 730 receives the input signal from an analog-to-digital converter or a power normalization unit of the receiver, or from other modules, and stores the input signal samples in its taps. The stored samples are input to the multiplexer circuit 700 that selects taps within a given tap window, and outputs the respective values to the arithmetic operations circuit 720. The tap selection of the present embodiment is done based on position information received from the position register 710 in reply to the integer shift that is provided by the loop filter 330.

In another embodiment, a ring buffer may be provided instead of the tap line 730. The ring buffer has a write and a read pointer. The input signal samples are stored in taps to which the write pointer points. The write pointer is updated every sample. The read pointer select at least one of the taps dependent on the signal that is indicative of the integer time shift.

Assuming $r(k)$ to be the value of the $k^{th}$ tap 730, and $pos(k)$ to be the position information, the output of the multiplexer circuit 700 to the arithmetic operations circuit 720 may be as follows:

out = ({56{$pos$[0]}} &{$r$[0], $r$[1], $r$[2], $r$[3]})

| ({56{$pos$[1]}} &{$r$[1], $r$[2], $r$[3], $r$[4]})

| ({56{$pos$[2]}} &{$r$[2], $r$[3], $r$[4], $r$[5]})

| ({56{$pos$[3]}} &{$r$[3], $r$[4], $r$[5], $r$[6]})

...

| ({56{$pos$[$k$]}} &{$r$[$k$], $r$[$k$+1], $r$[$k$+2], $r$[$k$+3]})

...

| ({56{$pos$[41]}} &{$r$[41], $r$[42], $r$[43], $r$[44]})

| ({56{$pos$[42]}} &{$r$[42], $r$[43], $r$[44], $r$[45]})

Based on this signal, the arithmetic operations circuit 720 then calculates the filtered output signal dependent on the Lagrange coefficients received from the loop filter 330. In the present embodiment, the arithmetic operations circuit 720 comprises a network of multipliers and adders.

The position register 710 may be realized by a series of registers R46–R86 that are clock driven. Assuming R(k) to be the registered value of the $k^{th}$ register, and this value is provided to the multiplexer circuit 700 as position data pos(k) the operation of the position register 710 may be written as:

```
if (interpolation filter active)
    if (integer shift == 2'b01)
        R[k]<=R[k+1], k=46,...,85; R[86]<=0
```

-continued

```
    else if (integer shift == 2'b10)
        R[k]<=R[k-1], k=47,...,86; R[46]<=0
    else R[k]<=R[k]
else R[k]<=0, k=46,...,66,68,...,86; R[67]<=1
```

Thus, the interpolation filter 300 is provided with special circuitry to realize an integer offset driven tap window selection based on the integer shift signal provided by the loop filter 330, and a Lagrange filtering based on the Lagrange coefficients that are also provided by the loop filter 330.

Figure 8:
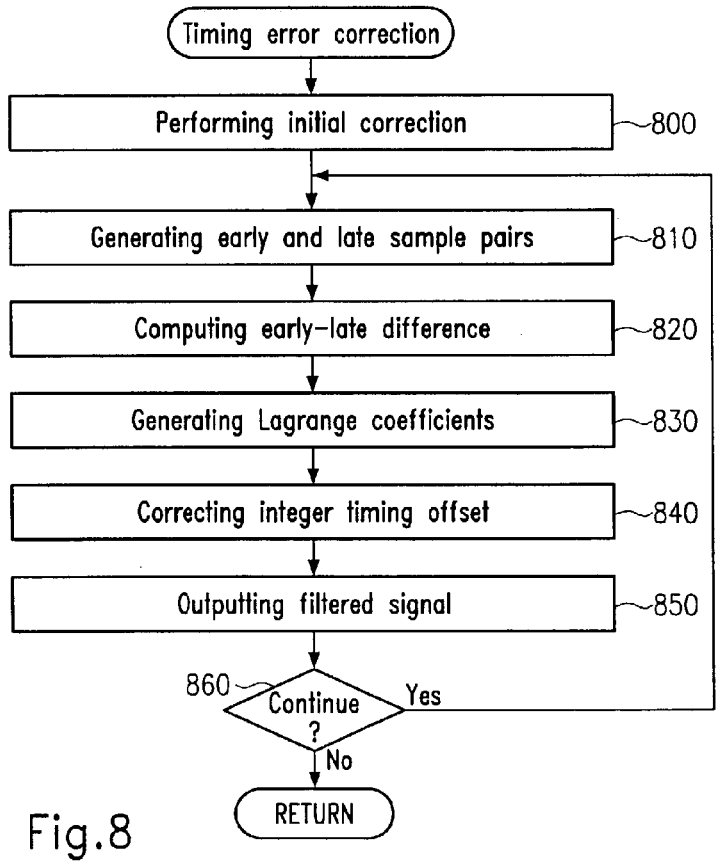
FIG. 8 is a flowchart illustrating a timing error correction process according to an embodiment.

Turning now to FIG. 8 which illustrates a timing error correction process according to an embodiment, there may be first an initial timing error correction performed in step 800 using default coefficient data in the interpolation filter 300. Then, early and late sample pairs are generated in step 810 by the correlator 310, and based on these samples, the early-late difference may be computed in step 820. It is to be noted, that any other error signal that is indicative of the difference may be computed instead. Further, it is to be noted that in other embodiments, a late-early difference may be computed in step 820.

Based on the difference data, the loop filter 330 now generates in step 830 Lagrange coefficients. As already explained above, this step may comprise two substeps where the first substep is used to detect the integer time shift, and the second substep is used to update the filter coefficients.

Based on the control signals that are generated by the loop filter 330 in step 830, i.e., based on the integer shift signal and the Lagrange coefficients, the integer timing offset is then corrected in step 840 by the interpolation filter 300. Further, the Lagrange filtering process is performed using the Lagrange coefficients provided by the loop filter 330, and the filtered signal is output in step 850. Finally, it is determined in step 860 whether the process is to be continued, and if so, the correction process returns to step 810.

As apparent from the foregoing description of the various embodiments, an improved timing error correction technique is provided that does not require the computation of cross-correlations, and that is further not based on synchronization preambles. Rather, the timing error correction scheme of the embodiments operates on the modulated signal flow itself. This does not only simplify the overall circuit arrangement but in addition leads to a more reliable timing error correction.

Moreover, the early-late correlation according to the embodiments, i.e., the operation of the sample pair generator 310, the difference computation unit 320, and the loop filter 330, may be driven by a clock that has a frequency of twice the chip rate. This advantageously allows for even more reducing the gate count since the number of multipliers and adders that are required in the circuits may be reduced to substantially the half of the number of modules that were necessary when operating the circuits at the symbol clock. More specifically, the early-late correlation based timing error computation in the correlator 310 may be performed on shared arithmetic modules for early and late sample pairs. Likewise, the operation of unit 320 may comprise a sequentialized absolute value generation and early-late difference computation so that again, arithmetic modules may be shared due to the sequentialization. Similarly, module sharing also applies to the loop filter 330 where the integration unit and the control signal output update is performed sequentialized.

Moreover, the above embodiments make advantageously use of the fact that the timing drift may at any one time be less than 50 ppm so that the timing shift Δ may have an absolute value of less than two samples. The present embodiments make use of this property by controlling the interpolation filter 300 at any one time to perform an integer shift of 1, 0, or −1 only, with the filter coefficients being updated based on the fractional time shift which has an absolute value of less than one.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A WLAN (Wireless Local Area Network) receiver having a timing error correction unit comprising:
    a time offset correction unit connected to receive an input signal having a timing error and output a signal having a corrected timing error, said time offset correction unit being adapted to perform a time offset correction algorithm to correct said timing error;
    a sample pair generation unit connected to receive the output signal of said time offset correction unit and adapted to generate at least one sample pair therefrom, said at least one sample pair comprising an early sample and a late sample;
    a difference computation unit connected to receive said at least one sample pair and adapted to generate an error signal indicative of the difference between the value of the early sample and the value of the late sample of the received sample pair; and
    a control unit connected to receive said error signal and adapted to generate at least one control signal therefrom, said control unit being connected to said time offset correction unit to provide said at least one control signal to said time offset correction unit to control said time offset correction algorithm, wherein said control unit is adapted to detect an integer time shift and a fractional time shift in said error signal.

2. The WLAN receiver of claim 1, wherein said time offset correction algorithm comprising a Lagrange filter algorithm.

3. The WLAN receiver of claim 2, wherein said at least one control signal comprises at least one Lagrange filter coefficient.

4. The WLAN receiver of claim 3, wherein said control unit is adapted to detect an integer time shift and a fractional time shift in said error signal and generate said at least one Lagrange filter coefficient based on said fractional time shift.

5. The WLAN receiver of claim 1, wherein said time offset correction unit comprises an interpolation filter.

6. The WLAN receiver of claim 1, wherein:
    said control unit is adapted to detect an integer time shift and a fractional time shift in said error signal,
    said at least one control signal comprises a signal indicative of said integer time shift, and
    said time offset correction unit comprises a time shift circuit to compensate for said integer time shift.

7. The WLAN receiver of claim 6, wherein said time offset correction unit comprises a tap line storing input signal samples, and said time shift circuit comprises a tap selection unit adapted to select at least one of the taps in said tap line dependent on said signal indicative of said integer time shift.

8. The WLAN receiver of claim 6, wherein said time offset correction unit comprises a ring buffer with a write and a read pointer for storing said input signal samples.

9. The WLAN receiver of claim 1, wherein said sample pair generation unit is a twice oversampled correlation unit adapted to compute a correlation function on the data of the output signal of said time offset correction unit.

10. The WLAN receiver of claim 1, wherein said sample pair generation unit comprises at least one first register storing said early sample and at least one second register storing said late sample, said first register and said second register being connected in series.

11. The WLAN receiver of claim 1, wherein said difference computation unit comprises an absolute value generator connected to receive the samples of said at least one sample pair and adapted to output absolute values thereof.

12. The WLAN receiver of claim 11, wherein said error signal is computed based on said absolute values.

13. The WLAN receiver of claim 11, wherein said difference computation unit is connected to receive real and imaginary samples, and said absolute value generator comprises an approximation unit adapted to receive the absolute values of said real and imaginary samples and provide an approximation of the square root of the sum of the squared absolute values of said real and imaginary samples.

14. The WLAN receiver of claim 13, wherein said approximation unit comprises:
    a first shift unit connected to receive the absolute value of said real sample;
    a second shift unit connected to receive the absolute value of said imaginary sample;
    a comparator adapted to compare the absolute value of said real sample with the absolute value of said imaginary sample and control said first and second shift units dependent on the comparison result; and
    an adder connected to receive the output data of said first and second shift units and generate the sum thereof.

15. The WLAN receiver of claim 11, wherein said difference computation unit comprises a register and a subtraction unit, said register being connected to an input port of said subtraction unit to provide registered data to said subtraction unit, said register further being connected to an output port of said subtraction unit to receive the subtraction result to be written into the register.

16. The WLAN receiver of claim 1, wherein said control unit comprises:
    an integration circuit adapted to perform an integration on a signal derived from said error signal; and
    a control signal update circuit adapted to generate and update said control signal,
    wherein said integration circuit and said control signal update circuit share at least one register.

17. The WLAN receiver of claim 1, wherein said control unit is adapted to detect said integer time shift in a first cycle and said fractional time shift in a second cycle, said second cycle following said first cycle.

18. The WLAN receiver of claim 17, wherein said control unit is further adapted to compensate said integer time shift in said first cycle.

19. The WLAN receiver of claim 18, wherein said control unit comprises a truncation unit for performing a symbol truncation in said second cycle after having compensated said integer time shift.

20. The WLAN receiver of claim 18, wherein said control unit comprises a stabilization unit for stabilizing a fractional time shift signal in said second cycle.

21. The WLAN receiver of claim 18, wherein said control unit comprises a Lagrange filter coefficient decoder adapted to generate at least one Lagrange filter coefficient from a fractional time shift signal in said second cycle.

22. The WLAN receiver of claim 21, wherein said at least one control signal comprises said at least one Lagrange filter coefficient.

23. The WLAN receiver of claim 1, wherein said time offset correction unit comprises a tap line storing input signal samples, and said time shift circuit comprises a multiplexer unit adapted to select at least one of the taps in said tap line dependent on said control signal.

24. The WLAN receiver of claim 23, wherein said at least one control signal comprises a signal indicative of said integer time shift, and said time offset correction unit further comprises a position register connected to receive said signal indicative of said integer time shift and output a tap selection signal to said multiplexer unit dependent thereon.

25. The WLAN receiver of claim 1, wherein said timing error correction unit further comprises:
a finite state machine connected to said time offset correction unit, said sample pair generation unit, said difference computation unit and said control unit for controlling said units by stepping through a plurality of predefined control states.

26. The WLAN receiver of claim 1, wherein said sample pair generation unit, said difference computation unit and said control unit are driven by a clock having a frequency of twice the chip rate.

27. A receiver synchronizer for performing time synchronization in a data communications receiver, said receiver synchronizer having a timing error correction unit comprising:
a time offset correction unit connected to receive an input signal having a timing error and output a signal having a corrected timing error, said time offset correction unit being adapted to perform a time offset correction algorithm to correct said timing error;
a sample pair generation unit connected to receive the output signal of said time offset correction unit and adapted to generate at least one sample pair therefrom, said at least one sample pair comprising an early sample and a late sample;
a difference computation unit connected to receive said at least one sample pair and adapted to generate an error signal indicative of the difference between the value of the early sample and the value of the late sample of the received sample pair; and
a control unit connected to receive said error signal and adapted to generate at least one control signal therefrom, said control unit being connected to said time offset correction unit to provide said at least one control signal to said time offset correction unit to control said time offset correction algorithm, wherein said control unit is adapted to detect an integer time shift and a fractional time shift in said error signal.

28. An integrated circuit chip having timing error correction circuitry comprising:
a time offset correction circuit connected to receive an input signal having a timing error and output a signal having a corrected timing error, said time offset correction unit being adapted to perform a time offset correction algorithm to correct said timing error;
a sample pair generation circuit connected to receive the output signal of said time offset correction circuit and adapted to generate at least one sample pair therefrom, said at least one sample pair comprising an early sample and a late sample;
a difference computation circuit connected to receive said at least one sample pair and adapted to generate an error signal indicative of the difference between the value of the early sample and the value of the late sample of the received sample pair; and
a control circuit connected to receive said error signal and adapted to generate at least one control signal therefrom, said control circuit being connected to said time offset correction circuit to provide said at least one control signal to said time offset correction circuit to control said time offset correction algorithm, wherein said control circuit is adapted to detect an integer time shift and a fractional time shift in said error signal.

29. A method of correcting a timing error in a data communications receiver, the method comprising:
receiving an input signal having a timing error;
correcting said timing error, wherein correcting said timing error comprises performing a time offset correction algorithm; and
outputting a signal having a corrected timing error,
wherein correcting said timing error comprises:
performing an early-late correlation on said signal having a corrected timing errors, wherein performing an early-late correlation comprises:
generating at least one sample pair from said signal having a corrected timing error, said at least one sample pair comprising an early sample and a late sample;
generating an error signal indicative of the difference between the value of the early sample and the value of the late sample; and
generating at least one control signal from said error signal, wherein generating said at least one control signal comprises detecting an integer time shift and a fractional time shift in said error signal;
wherein said time offset correction algorithm is performed dependent on said at least one control signal.

30. The method of claim 29, wherein said time offset correction algorithm comprising a Lagrange filter algorithm.

31. The method of claim 30, wherein said at least one control signal comprises at least one Lagrange filter coefficient.

32. The method of claim 31, wherein generating said at least one control signal comprises:
detecting an integer time shift and a fractional time shift in said error signal; and
generating said at least one Lagrange filter coefficient based on said fractional time shift.

33. The method of claim 29, wherein performing said time offset correction algorithm comprises:
operating an interpolation filter.

34. The method of claim 29, wherein:
generating said at least one control signal comprises detecting an integer time shift and a fractional time shift in said error signal,
said at least one control signal comprises a signal indicative of said integer time shift, and
performing said time offset correction algorithm comprises compensating said integer time shift.

35. The method of claim 34, wherein performing said time offset correction algorithm comprises operating a tap line storing input signal samples, and compensating said integer time shift comprises selecting at least one of the taps in said tap line dependent on said signal indicative of said integer time shift.

36. The method of claim 29, wherein generating said at least one sample pair is performed by computing a twice oversampled correlation function on said signal having a corrected timing error.

37. The method of claim 29, wherein generating said at least one sample pair comprises:
storing said early sample in a first register; and
storing said late sample in a second register, wherein said first and second registers are connected in series.

38. The method of claim 29, wherein generating said error signal comprises:
generating absolute values of the samples of said at least one sample pair.

39. The method of claim 38, wherein said error signal is computed based on said absolute values.

40. The method of claim 38, wherein generating said absolute values is performed for real and imaginary samples and comprises:
approximating the square root of the sum of the squared absolute values of said real and imaginary samples.

41. The method of claim 29, wherein said integer time shift is detected in a first cycle and said fractional time shift is detected in a second cycle, said second cycle following said first cycle.

42. The method of claim 41, wherein generating said at least one control signal further comprises:
compensating said integer time shift in said first cycle.

43. The method of claim 42, wherein generating said at least one control signal further comprises:
performing a symbol truncation in said second cycle after having compensated said integer time shift.

44. The method of claim 42, wherein generating said at least one control signal further comprises:
stabilizing a fractional time shift signal in said second cycle.

45. The method of claim 42, wherein generating said at least one control signal further comprises:
generate at least one Lagrange filter coefficient from a fractional time shift signal in said second cycle.

46. The method of claim 45, wherein said at least one control signal comprises said at least one Lagrange filter coefficient.

47. The method of claim 29, wherein performing said time offset correction algorithm comprises operating a tap line storing input signal samples, and detecting said time shifts comprises selecting at least one of the taps in said tap line dependent on said control signal.

48. The method of claim 47, wherein said at least one control signal comprises a signal indicative of said integer time shift, and performing said time offset correction algorithm further comprises:
generating a tap selection signal dependent on said integer time shift.

49. The method of claim 29, wherein correcting said timing error comprises:
operating a finite state machine to step through a plurality of predefined control states.

50. The method of claim 29, wherein said early-late correlation is performed at a clock frequency of twice the chip rate.

51. A WLAN (Wireless Local Area Network) receiver having a timing error correction unit comprising:
a time offset correction unit connected to receive an input signal having a timing error and output a signal having a corrected timing error, said time offset correction unit being adapted to perform a time offset correction algorithm to correct said timing error;
a sample pair generation unit connected to receive the output signal of said time offset correction unit and adapted to generate at least one sample pair therefrom, said at least one sample pair comprising an early sample and a late sample;
a difference computation unit connected to receive said at least one sample pair and adapted to generate an error signal indicative of the difference between the value of the early sample and the value of the late sample of the received sample pair; and
a control unit connected to receive said error signal and adapted to generate at least one control signal therefrom, said control unit being connected to said time offset correction unit to provide said at least one control signal to said time offset correction unit to control said time offset correction algorithm, wherein said control unit is adapted to detect an integer time shift and a fractional time shift in said error signal, wherein said at least one control signal comprises a signal indicative of said integer time shift, and wherein said time offset correction unit comprises a time shift circuit to compensate for said integer time shift.

52. A method of correcting a timing error in a data communications receiver, the method comprising:
receiving an input signal having a timing error;
correcting said timing error, wherein correcting said timing error comprises performing a time offset correction algorithm; and
outputting a signal having a corrected timing error,
wherein correcting said timing error comprises performing an early-late correlation on said signal having a corrected timing error, wherein performing an early-late correlation comprises:
generating at least one sample pair from said signal having a corrected timing error, said at least one sample pair comprising an early sample and a late sample;
generating an error signal indicative of the difference between the value of the early sample and the value of the late sample; and
generating at least one control signal from said error signal, wherein generating said at least one control signal comprises detecting an integer time shift and a fractional time shift in said error signal,
wherein said at least one control signal comprises a signal indicative of said integer time shift;
wherein said time offset correction algorithm is performed dependent on said at least one control signal, and wherein performing said time offset correction algorithm comprises compensating said integer time shift.

* * * * *